United States Patent [19]

Schoenborn

[11] Patent Number: 4,813,691
[45] Date of Patent: Mar. 21, 1989

[54] UNITIZED MULTI-LAYERED GASKET AND METHOD OF MAKING SAME

[75] Inventor: Anton Schoenborn, Chicago, Ill.

[73] Assignee: Fel-Pro Incorporated, Skokie, Ill.

[21] Appl. No.: 184,143

[22] Filed: Apr. 21, 1988

[51] Int. Cl.[4] ............................................. F16J 15/00
[52] U.S. Cl. ................................. 277/235 B; 277/236
[58] Field of Search ............. 277/235 B, 236, 237 R, 277/180, 192, 193, 2, 9, 9.5, 10, 11, DIG. 10, 227, 228, 229, 230, 231, 232, 233, 234, 235 R, 235 A, 207; 206/628; 264/257, 286; 493/437, 405

[56] References Cited

U.S. PATENT DOCUMENTS

| | | | |
|---|---|---|---|
| 1,788,041 | 1/1931 | Balfe | 277/235 B |
| 1,819,694 | 10/1926 | Sperry | 277/235 B |
| 2,034,610 | 3/1936 | Dickson | 277/235 B |
| 2,397,597 | 4/1946 | Dunkle | 277/235 B |
| 3,806,138 | 4/1974 | Herrington | 277/229 |
| 4,196,913 | 4/1980 | Oka | 277/235 B |
| 4,400,000 | 8/1983 | Moerk, Jr. | 277/235 B |
| 4,648,607 | 3/1987 | Yamada et al. | 277/235 B |
| 4,676,515 | 6/1987 | Cobb | 277/235 B |
| 4,728,110 | 3/1988 | Nakasoma | 277/235 B |
| 4,739,999 | 4/1988 | Ishii et al. | 277/235 B |
| 4,767,124 | 8/1988 | Udagawa | 277/235 B |

Primary Examiner—William D. Martin, Jr.
Assistant Examiner—Peter Arsenovic
Attorney, Agent, or Firm—Dressler, Goldsmith, Shore, Sutker & Milnamow, Ltd.

[57] ABSTRACT

A multiple-layered gasket comprising a metallic gasket body including multiple interconnected gasket sections. The multiple-gasket sections are interconnected along opposed peripheral edges in a manner allowing one gasket section to be folded into an overlapping engaging relationship with another gasket section. After the gasket sections are folded upon each other, bendable tabs extending from one or more of the gasket sections are manipulated to maintain the gasket sections in their relative folded condition. The present invention further contemplates a method for making such a multiple-layered gasket.

27 Claims, 3 Drawing Sheets

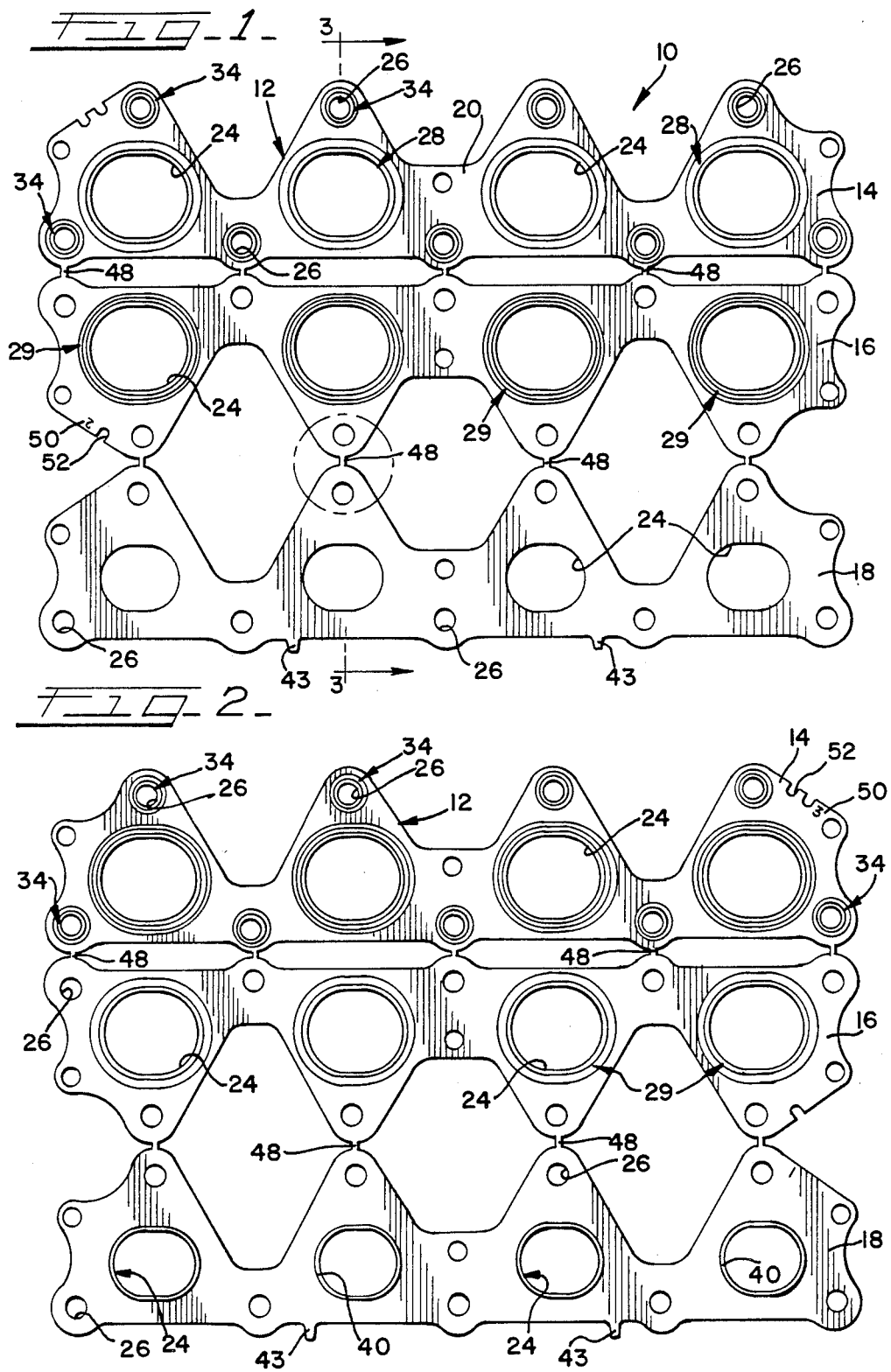

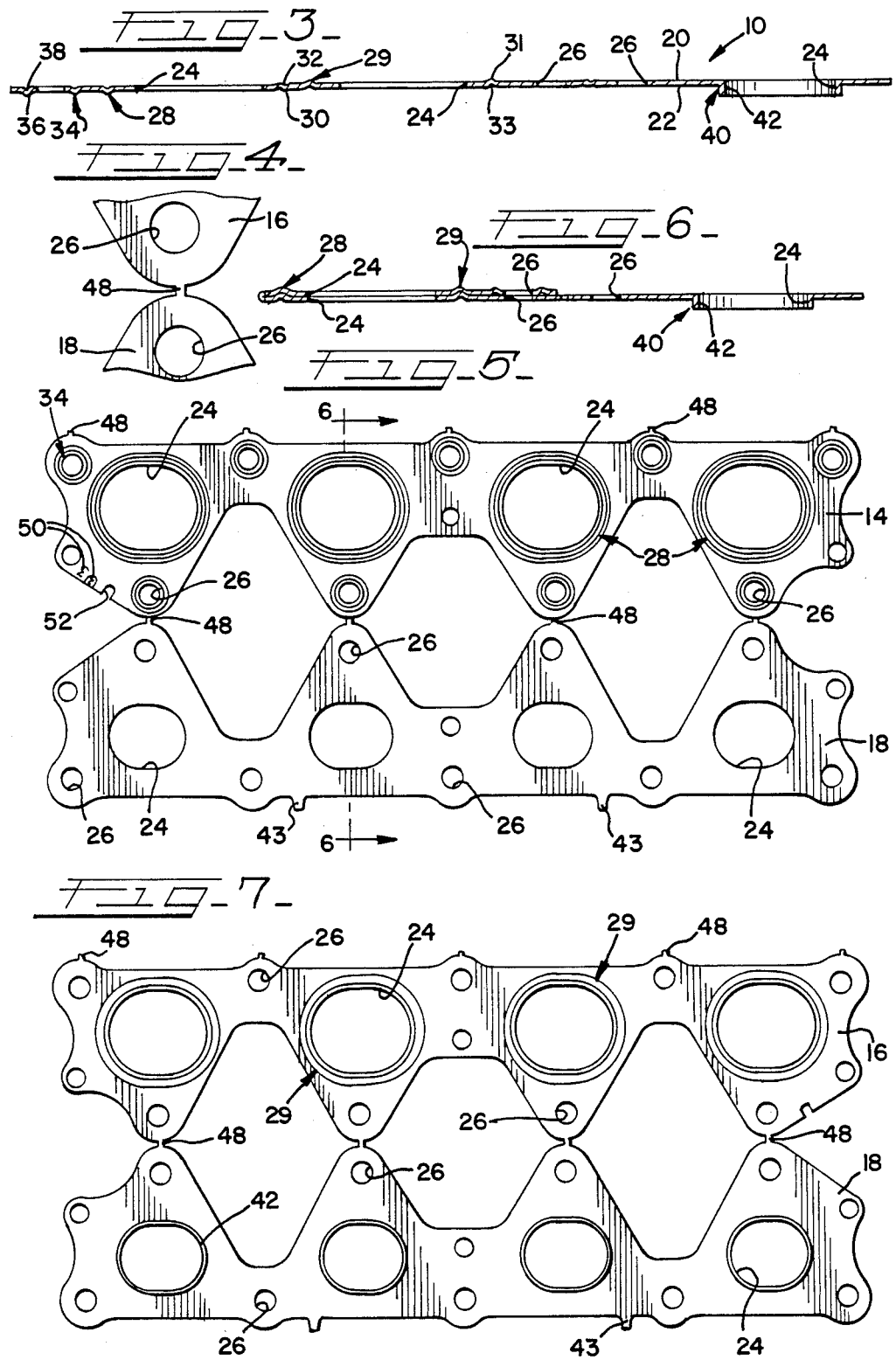

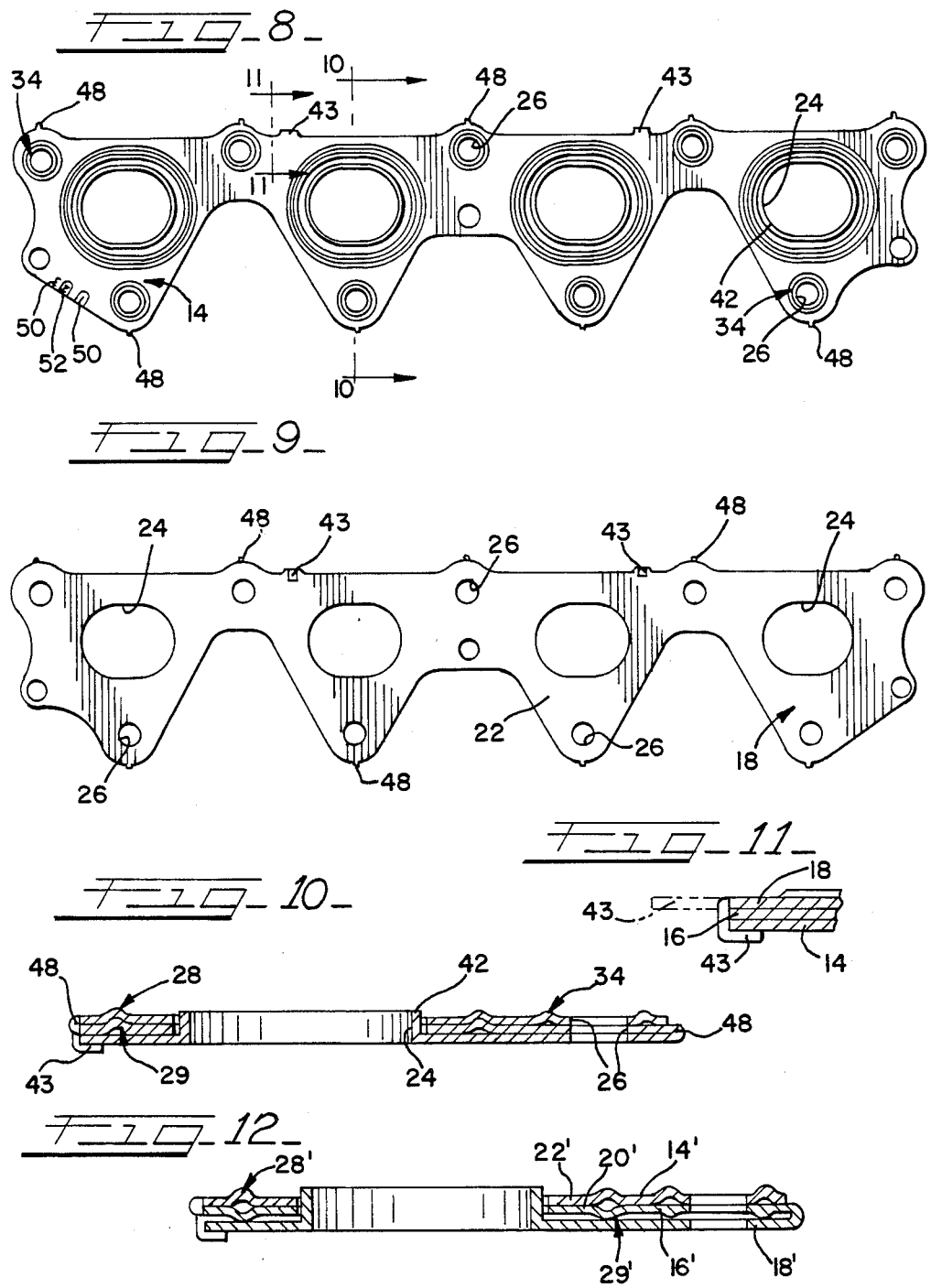

UNITIZED MULTI-LAYERED GASKET AND METHOD OF MAKING SAME

TECHNICAL FIELD

This invention generally relates to gasket assemblies and, more particularly, to a unitized gasket, especially for internal combustion engines, formed of multi-layered construction and a process for making same.

BACKGROUND OF THE INVENTION

Although the mating surfaces or pairs of surfaces to be sealed, such as an automotive engine block and a mating surface on an exhaust manifold, appear to be smooth and flat, most frequently they are not sufficiently smooth to provide an effective seal. Accordingly, a gasket is required to be placed between them to provide an effective seal against escaping fluids, such as gas vapors.

Multi-layer gasket assemblies are becoming more popular for use with automobile engines. Such a gasket assembly is comprised of two or more layered gasket pieces which are typically welded or riveted to each other. Each gasket piece may be similar in size and overall configuration to other gasket pieces used in the same assembly. Each piece can, however, include details which distinguish it from the other gasket pieces. That is, albeit similarly outlined or configured, one gasket piece may have one or more embossments provided thereon while another similarly outlined gasket piece in the same gasket assembly may have different embossments or other features provided thereon. Additonally, for example, one gasket piece in the assembly may be substantially flat while another gasket piece in the same assembly can include a flow tube extending from a source opening provided in that gasket piece.

Production of multi-layered gaskets typically comprises multiple steps or manufacturing processes. First, because each piece comprising the gasket assembly may be uniquely designed, individualized gasket pieces are mass produced, as by a stamping or blanking process. That is, steel or other suitable gasket material is continuously fed to a machine which stamps or blanks out individual gasket pieces having specific configurations. In the next step, these individual gasket pieces are separately processed, as by heat treating, etc. Then, the individualized gasket pieces are layered in a specific order and are, subsequently, assembled in that order. The individual pieces forming the gasket assembly are usually held together as an assemblage, as with rivets or spot welding. After the separate gasket pieces are joined together as a complete assembly, the resultant gasket is inspected for accuracy and compliance.

It is critical that each piece comprising the gasket assembly is layered in its proper order. Otherwise, the gasket assembly is likely to fail. Because the pieces comprising the gasket assembly may all be similar in size and overall configuration, assembly of the gasket can easily be done incorrectly. That is, gasket pieces may be arranged in an improperly layered order. Alternatively, and because the gasket pieces are individually manufactured, placed together, and then assembled, two of the same gasket pieces may be inadvertently assembled together. A myriad of other inadvertent yet incorrect combinations of gasket pieces is conceivable. Although inadvertent, such improper combinations or arrangements of the various gasket pieces can result in gasket failure.

SUMMARY OF THE INVENTION

In view of the above, and in accordance with the present invention, there is provided a multilayered gasket comprising a gasket body including multiple interconnected gasket sections. In a preferred form, the gasket body includes at least two gasket sections, with each gasket section defining a service opening and at least one relatively small aperture. A peripheral edge of a first of the gasket sections is interconnected with a peripheral edge of a second of the gasket sections in a manner allowing the first gasket section to be folded into an overlying engaging relationship with the second gasket section, with the aperture and service openings being in alignment.

In one form, the first and second gasket sections are integrally formed, as of metal, and are general coextensive. Moreover, at least one of the gasket sections defines a projecting embossment encircling the service opening defined by the gasket section. One or more bridges, which can be integral extensions of one of the gasket sections, serve to interconnect the gasket sections.

In another form of the invention, the gasket body includes a third gasket section. Bendable metallic bridges interconnect this third gasket section with the gasket body. Alternatively, the three gasket sections can be integrally formed along with the bridges interconnecting the gasket sections. Each gasket section can also include indicia for indicating an overlying relationship order for the gasket sections. The three gasket sections can be folded into an overlying relationship with each other in an accordion-like fashion with the apertures in the overlying sections being substantially aligned with each other. The various gasket sections are each foldable along fold lines defined by the gasket body at peripheral edges of the gasket sections after the sections are folded upon each other.

In a preferred form of the invention, one or more bendable closing tabs extend from at least one of the gasket sections. If so desired, such closing tabs can be integrally formed with one of the gasket sections. Such closing tabs can be manipulated to retain such gasket sections in an overlying engaging relationship relative to one another.

In accordance with the present invention, a method for making such a gasket involves providing multiple interconnected gasket sections with each gasket section defining a service opening and a relatively small aperture. A preferred method involves providing at least two interconnected gasket sections. An alternative method involves providing at least three interconnected gasket sections. The gasket sections may be integrally formed of metal.

Making a unitized multi-layered gasket according to the present invention further involves folding a first of the gasket sections into an overlying engaging relationship with a second of the gasket sections. The gasket sections are folded along a fold line defined at a peripheral edge of each gasket section after one gasket section is folded upon the other gasket section.

In those embodiments where three interconnected gasket sections are provided, the sections are preferably folded in an accordion relationship relative to each other.

The making of a multi-layered gasket can further involve providing an encircling embossment about each of the service openings on at least one of the gasket sections. The encircling embossments are formed on the gasket sections before they are folded upon each other.

Other steps involved with a method of forming a unitized gasket according to the present invention involve providing bendable closing tabs on at least one of the gasket sections and closing the tabs. Closing the tabs serves to retain the gasket sections in the folded accordion relationship relative to each other.

Because the gasket sections are interconnected to each other, they cannot become separated from each other. As such, the above-contemplated design assures repeatability and also proper gasket construction. That is, because the sections comprising the gasket are inseparable from one another, only the proper pieces are incorporated in each gasket assembly. Therefore, each gasket will repeatably be comprised of the same component pieces.

Moreover, because the gasket sections are interconnected, the layered orientation of each gasket section is fixed with respect to the other gasket sections. Because each section is folded or bent upon its adjacent gasket section, a proper layering order is assured. In this regard, and if desired, the gasket sections may be provided with indicia indicating an overlying relationship order for the gasket sections.

The manufacturing method involved with the present invention is most efficient and minimizes human error and labor involvement. Thus, a continuous roll of gasket material may be fed into a machine and a finished gasket would be automatically processed and formed thereby avoiding the possibility of inadvertent assemblage. As will be understood, the contemplated design minimizes in-process inventory, labor, material handling, and warehousing costs. If the gasket sections are, as is contemplated, integrally formed by a progressive die assembly from a single sheet of rolled stock, there is also a savings of set-up time for the machinery used to stamp of blank out the gasket sections. Rather than having to use multiple presses and die assemblies for producing multiple separate blanks, the design contemplated by the instant invention would require only one die assembly. Clearly, die cost would also be lower when only one die assembly is used as compared to multiple die assemblies which would be required if separate gasket blanks were to be used in making a gasket.

Other features and advantages of the present invention will become readily apparent from in the following detailed description, the appended drawings, and the accompanying claims.

BRIEF DESCRIPTION OF THE DRAWINGS

FIG. 1 is a top plan view of a unitized multi-layered gasket embodying principles of the present invention and showing the gasket prior to folding;

FIG. 2 is a bottom plan view of the gasket of FIG. 1;

FIG. 3 is a cross-sectional view taken along line 3—3 of FIG. 1;

FIG. 4 is an enlarged view of an area encircled in FIG. 1;

FIG. 5 is a top plan view of the gasket of FIG. 1 having a first gasket section folded into an overlying and engaging relationship relative to another gasket section of the gasket;

FIG. 6 is a bottom plan view of the gasket shown in FIG. 5;

FIG. 7 is a cross-sectional view taken substantially along line 7—7 of FIG. 5;

FIG. 8 is a top plan view of the gasket of FIG. 1 wherein each gasket section is accordion folded;

FIG. 9 is a bottom plan view of the gasket of FIG. 8;

FIG. 10 is a cross-sectional view taken substantially along line 10—10 of FIG. 8;

FIG. 11 is an enlarged fragmentary crosssectional view taken substantially along line 11—11 of FIG. 8; and FIG. 12 is a view like FIG. 10 but of a further embodiment of this invention.

DETAILED DESCRIPTION OF A PRESENTLY PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is shown in FIG. 1 a unitized multi-layered gasket 10 arranged in an unfolded configuration. When assembled in its operative condition, the gasket 10 is adapted to be disposed, in known manner, between a pair of surfaces to be sealed, such as between an engine block and a multiported manifold of an internal combustion engine and is compressed therebetween. The details of the engine per se, which may be of various forms, form no part of the present invention, except that a gasket embodying the principles of the present invention will be configured as dictated by the particular engine with which it is to be used, and will be proportioned to accommodate to the openings and surfaces in the block and manifold with which the gasket assembly is to be used and which the gasket assembly is to seal.

Referring now to FIGS. 1 and 2, the gasket 10 comprises a gasket body 12 including multiple gasket sections 14, 16 and 18. Although three gasket sections are illustrated, it will be appreciated and understood that more than three gasket sections could be provided without departing from the spirit and scope of this invention. In the preferred embodiment, each gasket section is formed of metal.

Each gasket section has certain features which are common amongst them. Those features which are common will be described referring to gasket section 14 but with the understanding that the other gasket sections include the same or similar features. Each gasket section defines a first, generally planar main surface 20 (FIG. 1) and a second generally planar main surface 22 (FIG. 2). Surfaces 20 and 22 are generally parallel to each other. Where, as here, there are at least three gasket sections, it is preferred that each gasket section be about 0.008 inch thick, but the gasket sections may range in thickness from about 0.005 inch to about 0.020 inch. Where there are only two gasket sections, or the application otherwise permits, thicknesses may range from about 0.005 inch to about 0.040 inch. Moreover, each gasket section defines one or more relatively large, clear-through service openings 24 and one or more relatively small apertures 26. The smaller apertures 26 may define bolt holes through which clamping bolts (not shown) may pass.

The gasket body 12 is preferably die cut or blanked out, such as with a stamping machine, punch press, or other suitable form of equipment to provide the requisite configuration to the gasket body 12. In the preferred form of the invention, multiple gasket sections 14, 16 and 18 are integrally formed from a single sheet of material during the stamping or punching process. As such, each section is of the same material but can be different in shape. The sections may be continuous or may be segmental.

As illustrated, gasket section 14 defines encircling embossments 28 arranged about each service opening 24. Embossments 28 are formed in a known manner as by pressing them into the planar sheet of which gasket section 14 may be formed. The sealing embossments may be of varying depths and dimensions depending upon gasket's use.

As is best shown in FIG. 3, embossments 28 comprise a projecting portion or projection 30 extending outwardly from the main or major surface 22, and a corresponding indentation, recess or cavity 32 which extends inward from major or main surface 20.

As illustrated, gasket section 14 further defines encircling embossments 34 arranged about certain of the bolt holes 26. The embossments 34 are formed in a known manner as by pressing them into the planar sheet from which the gasket section may be formed. The sealing embossments 34 may be of varying depths and dimensions depending upon the gasket's use.

As is best shown in FIG. 3, embossment 34 comprises a projecting portion or projection 36 extending outwardly from major or main surface 22, and a corresponding indentation, recess, or cavity 38 which extends inward from major or main surface 20. Each of the embossments 34 are of similar construction.

As illustrated, gasket section 16 defines encircling embossments 29 arranged about each service opening 24. Embossments 29 are formed in a similar manner to embossments 28 as by pressing them into a planar sheet of which gasket section 16 may be formed.

As best shown in FIG. 3, embossments 29 comprise a projecting portion or projection 31 extending outwardly from the main or major surface 20, and a corresponding indentation, recess, or cavity 33 which extends inwardly from major or main surface 22. The embossments 29 are arranged on gasket section 16 in an inverse manner to the embossments 28 arranged on gasket section 14. As such, and as seen in FIG. 6, when one gasket section is folded upon the other, embossments 28 and 29 are arranged in a complementary fashion.

As illustrated, gasket section 18 defines a series of flow tube formations 40 which are provided to improve the flow of exhaust gases through service openings 24. The flow tube formations 40 comprise a bent rim 42 extending around each service opening 24 provided in section 18. As seen in FIG. 3, each tube formation 40 extends substantially transversely away from the main or major surface 22 of gasket section 18. The projection 42 is formed as an integral part of gasket section 18.

Returning to FIG. 1, gasket section 18 further defines one or more bendable closing tabs 43 provided on an outwardly extending edge thereof. Preferably, the bendable tabs 43 are integrally formed with the gasket section from which they protrude but such tabs could comprise separate elements. Moreover, it should be appreciated that bendable tabs 43 could alternatively or additionally be provided on an outwardly extending edge of gasket section 14. With either embodiment, the bendable tabs 43 laterally extend away from the gasket section to which they are attached a sufficient distance to allow them to be manipulated and/or bent around the other gasket layers to secure or retain all of the layered sections in a folded engaging relationship with each other.

In accordance with this invention, the gasket sections comprising the gasket body are interconnected to each other. The present invention contemplates interconnecting the gasket sections in any suitable manner allowing the gasket sections to be folded into an overlying and engaging relationship with one another.

To effect these ends, one or more bendable connections can be used to interconnect the gasket sections to each other. In the preferred embodiment, and as best seen in FIG. 1, opposed peripheral edges on gasket sections 14, 16 and 18, respectively, are interconnected by a plurality of bendable bridges 48. As best illustrated in FIG. 4, relatively small bridges 48 are formed in a zone of adjacency between gasket sections 14 and 16.

During the stamping or punching process, multiple gasket sections, integrally formed, are provided in an adjacent side-by-side manner from a single metal sheet. As is conventional, the die assemblies for punching the gasket sections are designed to configure the gasket sections to correspond to the particular application with which they find use. Moreover, the die assemblies can be designed to provide the bridges 48 between adjacent areas of the gasket sections. In the preferred embodiment, the bridges 48 are formed as integral extensions between gasket sections.

As best illustrated in FIGS. 5, 6 and 7, the bendable connections 48 between the gasket section allow one interconnected gasket section 14 to be layered or folded into an overlying engaging relationship with another interconnected gasket section 16. Because the gasket sections are interconnected, they are not separated from one another when folded upon each other. That is, the bendable bridges 48 provided at the peripheral edges of the gasket sections 14 and 16 allow gasket section 14 to be folded while maintaining integrity between gasket sections. As seen in FIG. 6, when gasket sections 14 and 16 are folded upon each other, the respective service openings 24, the respective embossments 28 and 29, as well as the respective apertures 26 are all arranged in substantial alignment.

Moreover, the folding of one gasket section upon the other creates a fold line defined at the peripheral edge of the gasket sections after one gasket section is folded upon the other gasket section.

Thereafter, and as seen in FIGS. 8, 9 and 10, the other gasket section 18 can likewise be folded into an overlying engaging relationship with the other gasket sections 14, 16, preferably in an accordion-like fashion. As seen in FIG. 10, when the third gasket section 18 is folded into an engaging relationship with the other gasket sections, the flow tubes 40, formed as an integral part of gasket 18, transversely extend through the service openings 24 in the other gasket sections 14 and 16. That is, when the multiple gasket pieces are folded upon each other, a distal end of projection 42 extends through all layers of the gasket.

Each gasket section may further include indicia 50 (FIG. 8) which can be stamped or otherwise provided thereon. The indicia 50 are provided for indicating the desired overlying relationship order for the gasket sections. Associated notches 52 may be used to view the indicia when the gasket sections are folded.

As seen in FIG. 11, after the gasket sections comprising the gasket are folded, as in an accordion-like fashion, one upon the other, the distal or free end of each bendable tab 43 is folded over from its extended position, indicated by dash lines in FIG. 11, to interface with gasket section 14. The folded tabs 43 maintain and retain the gasket sections in their overlying and engaging relationship relative one another during packing, storage and installation.

In accordance with this invention, a method of manufacture involves providing multiple interconnected gasket sections, with each gasket section defining at least one service opening and at least one relatively small aperture. A preferred method involves providing at least two interconnected gasket sections. An alternative method involves providing at least three interconnected gasket sections all of which are integrally formed of metal.

These multiple interconnected gasket sections are then folded upon each other. That is, a first of the gasket sections is folded into an overlying engaging relationship with a second of the gasket sections along a fold line defined at a peripheral edge of each gasket section after one gasket section is folded upon the other gasket section. When three interconnected gasket sections are provided, they are preferably folded in an accordion-like relationship relative to each other.

Having folded the gasket sections into an overlying engaging relationship relative one another, closing tabs 43 are manipulated to retain the gasket sections in either folded relationship relative to each other.

A preferred method of manufacture may further involve providing an embossment on at least one of the gasket sections. The embossment encircles the service opening defined by the gasket section. The embossing operation, if any, is performed on the gasket section before the gasket sections are folded upon each other.

In another preferred form of the invention as shown in FIG. 12, and to enhance sealing, the embossments 28', 29' defined by gasket sections 14', 16', respectively, are formed with the projecting portion of each embossment 28', 29' extending away from main or major surface 22' of each gasket section and the indentation, recess, or cavity of each embossment extending inwardly from main or major surface 20' of each gasket section. As such, and when gasket section 14' is folded into an overlying engaging relation with gasket section 16', the projections of each embossment will extend in opposite directions and a compressible space will be provided between oppositely directed, and confronting, indentations of each embossment.

Because each of the gasket sections comprising the unitized gasket are interconnected to each other, they cannot become separated from each other. Therefore, the gasket will always include a proper combination and sequence of only interconnected gasket sections. Furthermore, the gasket sections may be interconnected in a manner defining the order with which they are to be folded upon each other. As such, each gasket section will have a proper orientation relative another gasket section and relative to the unitized gasket assembly. In effect, the unitized contemplated multi-layered gasket assembly avoids the possibility of human error and inadvertent assemblage.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A unitized multi-layered gasket comprising a gasket body including at least two gasket sections, each said gasket section defining a circumscribing peripheral edge, with each gasket section defining a service opening within its periphery and at least one relatively small aperture within its periphery, with the peripheral edge of a first of said gasket sections being foldably secured to the adjacent peripheral edge of a second of said gasket sections in a manner allowing said first gasket section to be folded into an overlying engaging relationship with said second gasket section with said respective apertures and said respective service openings being in alignment.

2. The unitized multi-layered gasket of claim 1 wherein said first and second gasket sections are integrally formed and are generally coextensive when in said overlying engaging relationship.

3. The unitized multi-layered gasket of claim 3 wherein said gasket body is metallic.

4. The unitized multi-layered gasket of claim 1 further including a third gasket section and bendable metallic means securing said third gasket section to said gasket body.

5. The unitized multi-layered gasket of claim 5 wherein at least two of said gasket sections are integrally formed of metal.

6. The unitized multi-layered gasket of claim 5 wherein at least three of said gasket sections are integrally formed.

7. The unitized multi-layered gasket of claim 5 wherein each gasket section includes indicia for indicating an overlying relationship order for said gasket sections.

8. The multi-layered gasket of claim 1 wherein said gasket body further includes one or more bendable closing tabs extending from at least one of said gasket sections and which can be manipulated to retain such gasket sections in an overlying engaging relationship relative to one another.

9. The unitized multi-layered gasket of claim 8 wherein said closing tabs are integrally formed with one of said gasket sections.

10. The unitized multi-layered gasket of claim 1 wherein at least one of said gasket sections defines a projecting embossment encircling the service opening defined by said gasket section.

11. The unitized multi-layered gasket of claim 1 wherein said gasket sections are secured by one or more bridges, with each bridge being an integral extension of one of said sections.

12. A unitized multi-layered exhaust manifold gasket comprising:
a metallic gasket body comprising first and second gasket sections which are bendable into an overlying engaging relationship with each other, with each gasket section defining a service opening and at least one relatively small aperture; and bendable means provided at peripheral edges of the first and second gasket sections for interconnecting said first and second gasket sections to each other and wherein said bendable means comprise a plurality of bridges for joining adjacent gasket sections to each other.

13. The exhaust manifold gasket of claim 12 wherein said first and second sections and said bridges are integrally formed from metal sheet.

14. The exhaust manifold gasket of claim 12 wherein at least one of said gasket sections is provided with an encircling embossment provided about said service opening.

15. A unitized multi-layered exhaust manifold gasket comprising:
   a metallic gasket body comprising first and second gasket sections which are bendable into an overlying engaging relationship with each other, with each gasket section defining a service opening and at least one relatively small aperture; and
   bendable means provided at peripheral edges of the first and second gasket sections for interconnecting said first and second gasket sections to each other and further including a third metallic gasket section and bendable metallic means interconnecting the third gasket section to said gasket body such that said third gasket section is bendable into an overlying and engaging relationship with another gasket section.

16. The exhaust manifold gasket of claim 15 wherein at least two of said gasket sections are integrally formed.

17. A unitized multi-layered gasket comprising:
   a gasket body defining at least three interconnected gasket sections, each of said sections defining a service opening and a relatively small aperture, said gasket sections being interconnected in a manner allowing said gasket sections to be folded into an overlying engaging relationship with each other in an accordion-like fashion with said apertures being substantially aligned with each other, and wherein said gasket sections are each foldable along fold lines defined by said gasket body at peripheral edges of said gasket sections after the sections are folded upon each other.

18. The multi-layered gasket of claim 17 wherein said gasket body further defines a plurality of bridges provided at peripheral edges of said gasket sections for interconnecting one gasket section with another.

19. The multi-layered gasket of claim 17 wherein at least one of said gasket sections includes an encircling embossment arranged about said service opening and another gasket section includes a flow tube extending from a service opening in said another gasket section and through the service openings in the other gasket sections when the gasket sections are folded upon each other.

20. The unitized multi-layered gasket of claim 17 wherein said gasket body further defines one or more bendable closing tabs extending from at least one of said gasket sections for retaining said gasket sections in an overlying relationship relative to each other.

21. A method of forming a unitized multilayered gasket assembly comprising the steps of:
   providing at least two interconnected gasket sections each defining a service opening and a relatively small aperture; and
   folding a first of said gasket sections into an overlying engaging relationship with a second of said gasket sections along a fold line defined at a peripheral edge of each gasket section after one gasket section is folded upon the other gasket section.

22. The method of forming a unitized multilayered gasket according to claim 21 including a further step of providing an encircling embossment about said service opening on at least one of said gasket sections before said gasket sections are folded upon each other.

23. The method of forming a unitized multilayered gasket according to claim 21 including a further step of providing at least three interconnected gasket sections each defining a service opening and a relatively small aperture.

24. The method of forming a unitized multilayered gasket according to claim 23 including a further step of folding said sections in an accordionlike relationship relative to each other.

25. The method of forming a unitized multilayered gasket according to claim 24, and wherein said gasket sections are integrally formed from metal.

26. The method of forming a unitized multilayered gasket according to claim 25 including a further step of folding said sections in an accordionlike relationship relative to each other.

27. The method of forming a unitized multilayered gasket according to claim 21 including further steps of providing bendable closing tabs on at least one of said sections, and closing said tabs to retain the gasket sections in said folded accordion-like relationship relative to each other.

* * * * *

UNITED STATES PATENT AND TRADEMARK OFFICE
CERTIFICATE OF CORRECTION

PATENT NO. : 4,813,691
DATED : March 21, 1989
INVENTOR(S) : Anton Schoenborn

It is certified that error appears in the above-identified patent and that said Letters Patent is hereby corrected as shown below:

IN THE SPECIFICATION:

Column 1, lines 33-34, substitute --Additionally-- for "Additonally".

IN THE CLAIMS:

Column 8, line 29, change the numeral "3" to --2--;
Column 8, line 35, change the numeral "5" to --4--;
Column 8, line 38, change the numeral "5" to --4--;
Column 8, line 41, change the numeral "5" to --4--;
Column 10, line 39, change the numeral "24" to --23--;
Column 10, line 46, change the numeral "21" to --26--.

Signed and Sealed this

Thirty-first Day of October, 1989

Attest:

DONALD J. QUIGG

*Attesting Officer*     *Commissioner of Patents and Trademarks*